Sept. 15, 1936.  R. L. TRIPLETT  2,054,642
ELECTRICAL TESTING INSTRUMENT
Filed May 6, 1932  3 Sheets-Sheet 1

RAY I. TRIPLETT, Inventor
By Toulmin & Toulmin
Attorneys

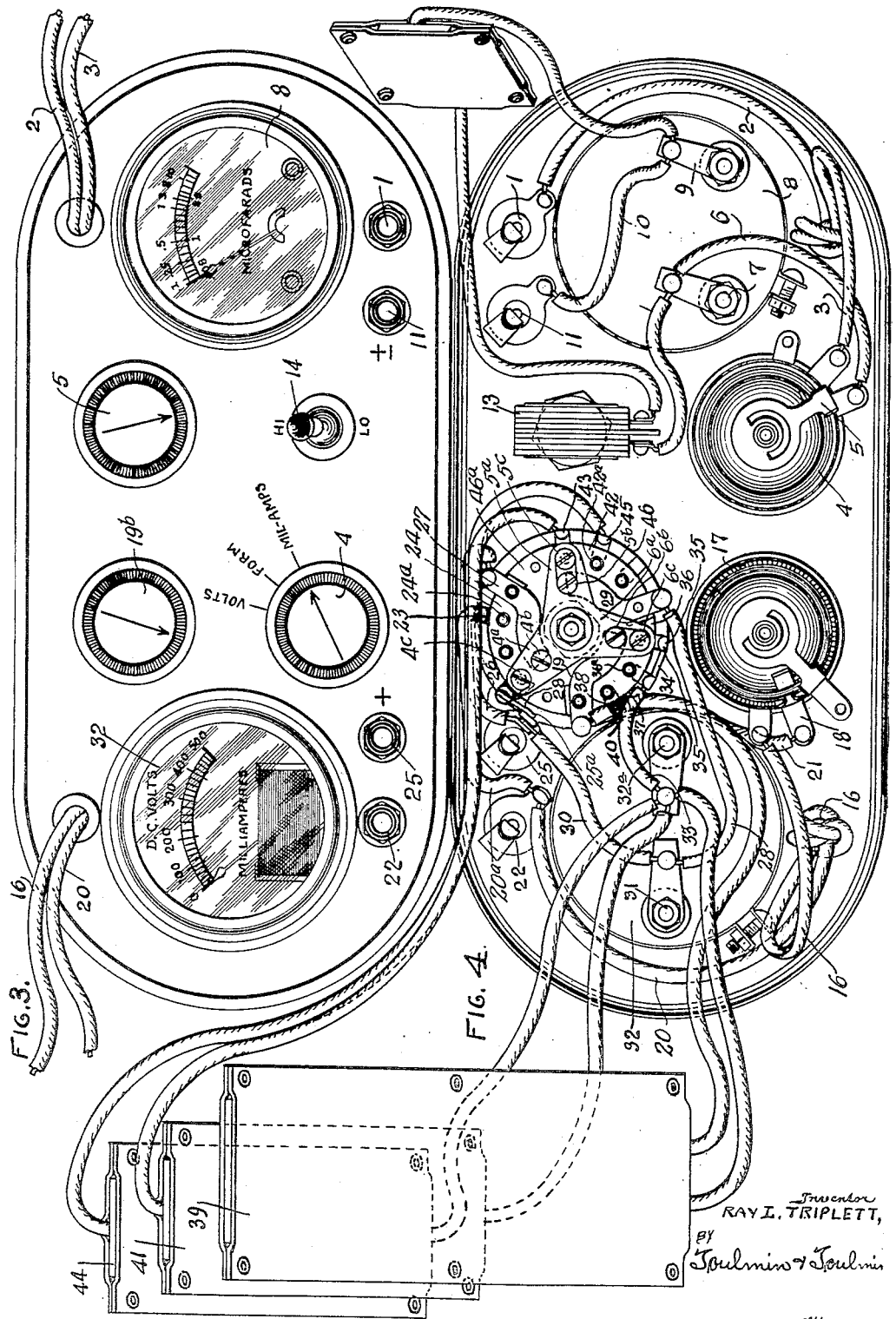

Sept. 15, 1936.    R. L. TRIPLETT    2,054,642
ELECTRICAL TESTING INSTRUMENT
Filed May 6, 1932    3 Sheets-Sheet 3
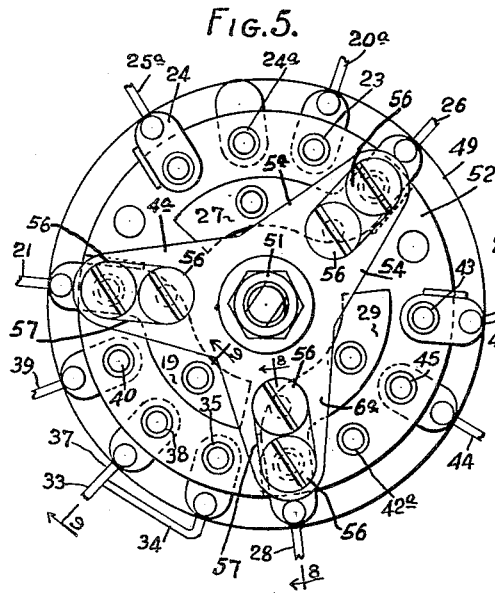
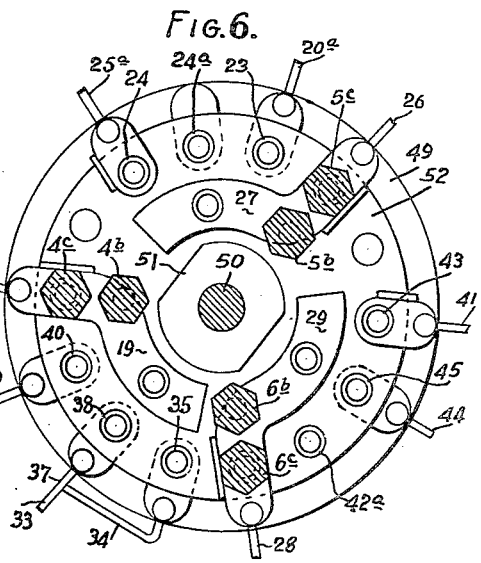
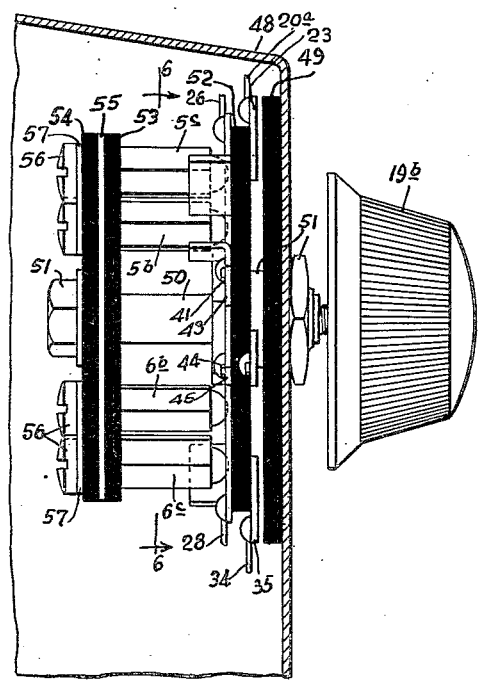
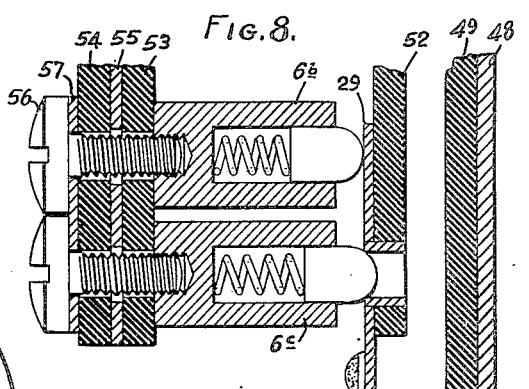
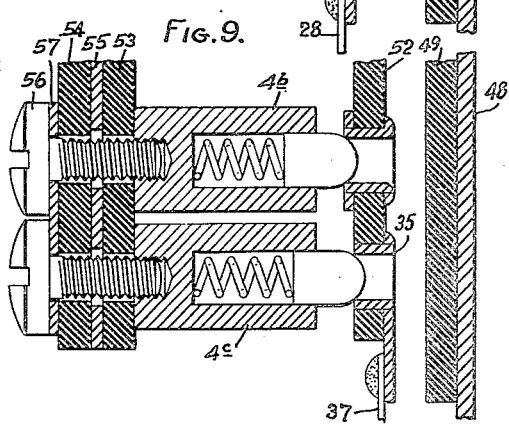
INVENTOR
RAY L. TRIPLETT,
By Toulmin & Toulmin
ATTORNEYS Patented Sept. 15, 1936

2,054,642

UNITED STATES PATENT OFFICE 2,054,642

ELECTRICAL TESTING INSTRUMENT

Ray L. Triplett, Bluffton, Ohio

Application May 6, 1932, Serial No. 609,748

5 Claims. (Cl. 175—183)

My invention relates to an apparatus and method of testing condensers to determine whether they are of their rated capacity.

Particularly, it is adapted for testing condensers for use in radio apparatus.

It is the object of my invention to provide a portable instrument being self contained in one casing and with a single set of controls having means of testing paper type condensers and electrolytic condensers so as to provide in a single instrument means of testing the complete capacity of all condensers.

In particular, it is my object to provide a testing apparatus and a method for testing electrolytic condensers by following the following method:

(1) First, the rheostat which is opposite the D. C. meter, is adjusted to have the meter reading at 300 volts when the selector switch is set in the "volts" position.

(2) Next, the selector switch is moved to the "form" position. The forming process will start with the meter needle at near full scale and be completed when the needle recedes to zero or near zero.

(3) Electrolytic condensers which are defective or leak badly will not form properly. If an electrolytic condenser is left in circuit ten to fifteen minutes and shows no indication of forming, it is defective and no further tests need be made. New electrolytic condensers or those which have been out of use for some two weeks or more require about fifteen minutes' time to form properly.

(4) Next, the selector switch is placed in the "milamps" position and the milliampere output of the condenser is read directly. A good electrolytic condenser could show up to 2 milliamperes per microfarad. A higher or fluctuating reading indicates the condenser is defective.

(5) Should the meter indication throw the needle violently off scale the condenser should be removed at once as a short may damage the instrument.

It is my object to test electrolytic condensers without removing them from the radio set and to have a convenient method of applying the radio set power, which is already connected to the condenser.

Referring to the drawings:

Figure 3 is a front elevation of the combined portable instrument including both testing circuits and apparatus;

Figure 4 is a rear elevation thereof with the resistances moved to one side clearly disclosing the mechanism from the rear of the casing.

Figure 5 is a bottom plan view of the selector switch.

Figure 6 is a section substantially on the line 6—6 of Figure 7.

Figure 7 is a section through the instrument casing showing in side elevation the selector switch.

Figure 8 is a section on the line 8—8 of Figure 5.

Figure 9 is a section on the line 9—9 of Figure 5 with the switch rotor positioned so that one of its arms is in proper position for a section therethrough.

Figure 1:
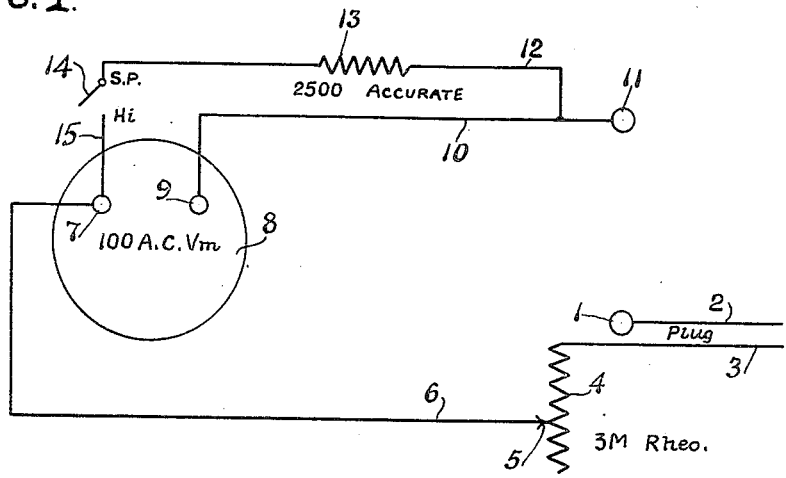
Figure 1 is a wiring diagram of that part of the apparatus devoted to testing the paper type condenser.

Referring to the drawings in detail, and particularly to the apparatus for testing the paper type condensers (Figure 1), the line 2 is one side of an alternating current supply line connected to a socket 1, the other side of which is designated at 3. This line 3 is connected into a rheostat at 4 having an adjustable member 5 connected to one end of the line 6, the other end of which is connected to the terminal 7 of the mfd. meter 8.

The other terminal 9 of this meter is connected by the line 10 to the receiving socket 11.

A condenser that is to be tested is plugged into the sockets 1 and 11. The circuit also includes the line 12 with the resistance 13 in circuit, such line having the switch 14 for connecting the line to the terminal 7 through the line 15.

The switch 14 is used to bring in the upper scale of the meter 8 as when that switch 14 is closed the upper scale is used in order to get the high range reading.

The adjustable resistance 4 is used for the low range or lower scale reading.

Turning to the part of the instrument for testing electrolytic condensers, (Figure 2) 16 indicates the positive side of voltage supply, such as the plate circuit of a power tube. This line is connected to a rheostat 17 having a member 18 which is connected to the switch plate 19a of a rotary selector switch 46 and by a wire 21 to the plate 19. The switch plate 19a moves to successive positions over the rheostat 17 by a button 19b.

The negative side of the voltage supply is through the line 20 connected to the plug socket 22 which is connected by line 20a to the plate 24 at 23 which is a stationary plate of the selector switch. The other plug receiving socket 25 is connected by the line 26 to the fixed contact plate 27. The lines 28 and 30 lead from the socket 25 to the third plate 29 of the rotary selector switch. The line 30 connects the socket 25 to the terminal 31 of the indicating meter 32 which is a direct current meter indicating from zero to 500 volts and also is a meter indicating 0—25—100 milliamperes. The other terminal 32a of this meter is connected by a wire 33 and a wire 34 at a point 35 to a switch plate 36. It is also connected by the wire 37 to the switch plate 36 at 38. The resistance 39 is connected to the switch plate 36 at 40.

The terminal 32a is connected through the resistance 41 to the switch plate 42 as at 43. It is connected through the resistance 44 to the plate 42 as at 45.

For the purpose of convenience, a selector switch is designated as a whole by the numeral 46. The selector switch button on the face of the instrument is designated 47. The selector switch is composed of three radially extending arms. One of these arms 4a has thereon a contact 4b for contacting with the plate 27, and a second contact 4c for contacting with the plate 24. Another arm 5a has thereon a contact 5b for contacting with the plate 29, and a second contact 5c contacting with the plate 42. It has a third arm 6a which has a contact 6b contacting with the plate 19, and a contact 6c contacting with the plate 36.

Extending over the plates 24, 36, and 42 is an insulating disc 46a, which is beneath the plates 19, 27 and 29. The upper surface of this insulating disc is connected with the plate 24 by means of contacts 24a, with the plate 36 by means of contacts 36a and with the plate 42 by means of contacts 42a. These contacts are adapted to be engaged by the contacts on the selector switch. The arms of the selector switch with the contact members thereon bridge the spaces between the plates 19, 27, and 29 on one hand, and the plates 24, 36, and 42 on the other hand.

The operating parts of the instrument are supported by and partly inclosed in a casing 48, which has in one end thereof a disc 49 of insulating material supported on the casing by means of a sleeve and nut 51 which extend through the casing and the disc. This sleeve passes through holes provided therefor and has a hole through which a shaft 50 extends and in which it rotates.

Supported in spaced relationship with the disc 49 is a disc 52 composed of insulating material and carrying fixed contacts, such as 43, 45 and others located adjacent the fixed contact plates 19, 29 and 27. Supported in spaced relationship with the disc 52 is a three-prong contact member composed of insulating parts 53 and 54, spaced by means of a metal plate 55. These parts are held assembled by means of screws 56. These screws serve to hold the contact member assembled with the contacts 4b, 4c, 5b and 5c. These screws also serve to support metal conductors 57, one for each arm of the contact member. These arms are indicated by the reference characters 4a, 5a and 6a.

Adjust the selector switch 46 to "volt" position so that the switch terminal 40 is engaged. Then adjust the rheostat switch 19a to extreme right until the voltage reads on the upper scale of the meter 32. Then move the selector switch 46 to "form" position which has a high milliampere reading and should start about 80 milliamperes, or about 20 on the lower scale, to determine the conductivity of the electrolytic condenser with the needle at maximum scale to secure a high milliampere reading.

The needle then gradually recedes to zero if the electrolytic condenser is operating correctly. If it is defective, or it is leaking badly and will not form properly, the meter needle will stay at the top of the scale.

If it is correctly forming, I then set the selector switch 46 on the milliampere position for reading on the lower scale. If the electrolytic condenser is in good condition, it should show from zero up to two milliamperes per microfarad of capacity.

Figure 2:
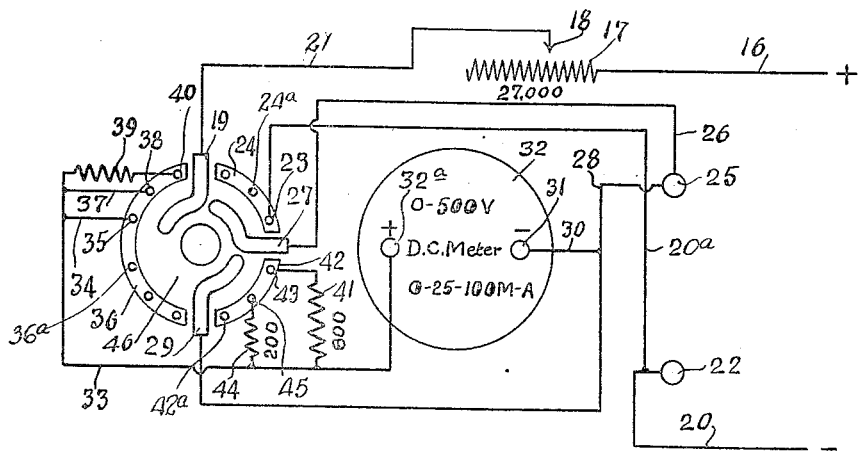
Figure 2 is a wiring diagram of the apparatus for testing the electrolytic condenser with the selector switch contacts shown in bottom plan view, corresponding to Figures 5 and 6.

In the operation of the instrument it will thus be seen, by a comparison of Figures 2 and 5, that when the three-armed switch member is in the position shown in Figure 5 the outer and inner contacts thereof will both rest upon the inner arcuate contact plates 19, 27, and 29. If now the three-armed switch member is moved to its first or "volts" position, this being one step counterclockwise in Figure 5, the resistor 39 attached to the switch contact 40 will be connected to the arcuate switch plate 19 and its line 21 through the switch arm contacts on the arm 4a. At the same time the switch arm contacts on the arm 6a will interconnect the arcuate switch plate 29 with the switch contact 42a, the latter having no outlet connection, thus deenergizing the line 28 connected to the arcuate switch plate 29. The contacts on the third switch arm 52 will interconnect the arcuate switch plate 27 and its line 26 to the switch contact 23 and its line 20a.

If now the three-armed switch member is moved to its second or "form" position, the lines 33 and 37 to the switch contact 38 will be connected to the arcuate switch plate 19 and its line 21 through the contacts of the switch arm 4a. At the same time the resistor 44, attached to the switch contact 45, will be connected to the arcuate switch plate 29 through the switch contacts of the switch arm 6a. Finally, the line 26, leading to the arcuate switch plate 27, will be deenergized by its being connected through the contacts of the switch arm 5a to the switch contact 24a having no outlet connection.

In the third or "milamps" position the line 34, leading to the switch contact 35 (Fig. 5), will be connected through the switch contacts of the switch arm 4a to the arcuate switch plate 19 and its line 21. The resistor 41, attached to the switch contact 43, will be connected through the contacts of the switch arm 6a to the arcuate switch plate 29 and its line 28. The line 26, leading to the arcuate switch plate 27, will remain deenergized by being connected through the contacts of the switch arm 5a to the switch contact 24 which has no outlet connection.

It will be understood that I desire to comprehend within my invention such modifications as may be necessary to adapt it to varying conditions and uses.

Having thus fully described my invention, what I claim as new and desire to secure by Letters Patent, is:

1. In combination in an electrolytic condenser testing instrument, a current-measuring device, a circuit arranged to apply a direct current of a predetermined voltage to said condenser, an auxiliary circuit having therein means for selectively changing said voltage to a different voltage, and switch means arranged in one position to apply said first-mentioned voltage across the opposite poles of said condenser to form the dielectric thereof at said first-mentioned voltage and in another position to apply said different voltage across said opposite condenser poles and to insert said current-measuring device in said circuit to measure the current leakage through said condenser at said different voltage.

2. In combination in an electrolytic condenser testing instrument, a current-measuring device, a circuit arranged to apply a direct current to said condenser, means in said circuit for adjustably varying the voltage thereof to apply a predetermined voltage to said condenser, an auxiliary circuit having therein means for changing said voltage to a different voltage, and switch means arranged in one position to apply said first-mentioned voltage across the opposite poles of said condenser to form the dielectric thereof at said first-mentioned voltage and in another position to connect said auxiliary circuit therewith to apply said different voltage across said opposite condenser poles and to insert said current-measuring device in said circuit to measure the current leakage through said condenser at said different voltage.

3. In combination in an electrolytic condenser testing instrument, a current-measuring device, a circuit arranged to apply a direct current to said condenser, means in said circuit for adjustably varying the voltage thereof to apply a predetermined voltage to said condenser, an auxiliary circuit having therein resistance means for changing said voltage to a different voltage, and switch means arranged in one position to apply said first-mentioned voltage across the opposite poles of said condenser to form the dielectric thereof at said first-mentioned voltage and in another position to connect said auxiliary circuit therewith to apply said different voltage across said opposite condenser poles and to insert said current-measuring device in said circuit to measure the current leakage through said condenser at said different voltage.

4. In combination in an electrolytic condenser testing instrument, a current-measuring device, a voltage-measuring device, a circuit arranged to apply direct current to said condenser, means for adjustably altering the voltage of said circuit, and switch means arranged in one position to insert said voltage-measuring device in said circuit to indicate the voltage thereof as obtained by said voltage-adjusting means, in another position to apply said voltage across the opposite poles of said condenser to form the dielectric thereof and in a third position to insert said current-measuring device in said circuit to measure the current leakage through said condenser.

5. In combination in an electrolytic condenser testing instrument, a current-measuring device, a voltage-measuring device, a circuit arranged to apply direct current to said condenser, means for adjustably altering the voltage of said circuit, means for changing said adjusted voltage to a different voltage, and switch means arranged in one position to insert said voltage-measuring device in said circuit to indicate the voltage thereof as obtained by said voltage-adjusting means, in another position to apply said voltage across the opposite poles of said condenser to form the dielectric thereof and in a third position to apply said different voltage across said opposite condenser poles and to insert said current-measuring device in said circuit to measure the current leakage through said condenser at said different voltage.

RAY L. TRIPLETT.